(12) United States Patent
Otake

(10) Patent No.: US 12,041,209 B2
(45) Date of Patent: *Jul. 16, 2024

(54) IMAGE READING APPARATUS AND IMAGE FORMING APPARATUS

(71) Applicant: CANON KABUSHIKI KAISHA, Tokyo (JP)

(72) Inventor: Akira Otake, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

This patent is subject to a terminal disclaimer.

(21) Appl. No.: 17/711,772

(22) Filed: Apr. 1, 2022

(65) Prior Publication Data

US 2022/0224800 A1 Jul. 14, 2022

Related U.S. Application Data

(62) Division of application No. 17/096,363, filed on Nov. 12, 2020, now Pat. No. 11,330,135.

(30) Foreign Application Priority Data

Nov. 29, 2019 (JP) .................................. 2019-216149

(51) Int. Cl.
  *H04N 1/04* (2006.01)
  *H04N 1/00* (2006.01)
  *H04N 1/024* (2006.01)
  *H04N 1/028* (2006.01)

(52) U.S. Cl.
  CPC ..... *H04N 1/02825* (2013.01); *H04N 1/00559* (2013.01); *H04N 1/00795* (2013.01); *H04N 1/0249* (2013.01)

(58) Field of Classification Search
  None
  See application file for complete search history.

(56) References Cited

U.S. PATENT DOCUMENTS

| 5,675,431 A | 10/1997 | Bock .......................... 359/216.1 |
| 6,216,952 B1 | 4/2001 | Mou ............................ 235/469 |
| 6,400,484 B1 | 6/2002 | Wang et al. ............... 359/196.1 |

(Continued)

FOREIGN PATENT DOCUMENTS

| JP | H11-331496 | 11/1999 |
| JP | 2000-131583 | 5/2000 |
| JP | 2017-163604 | 9/2017 |

OTHER PUBLICATIONS

Office Action dated Aug. 8, 2023 in counterpart Japanese Application No. 2019-216149, together with English translation thereof.

*Primary Examiner* — Cheukfan Lee
(74) *Attorney, Agent, or Firm* — Venable LLP

(57) ABSTRACT

An image reading apparatus for reading an image of an original includes an illumination portion for illuminating the original with light, a reflection member including a reflecting surface for reflecting the light from the original; a converting portion for photoelectrically converting the light reflected by the reflection member, and a casing for accommodating the reflection member. The casing is provided with an opening which is open to an outside of the casing. A surface of the reflecting member opposite from the reflecting surface and a portion defining the opening are bonded to each other with an adhesive.

16 Claims, 7 Drawing Sheets

(56) References Cited

U.S. PATENT DOCUMENTS

| | | | |
|---|---|---|---|
| 7,619,828 B2 | 11/2009 | Nogami | 359/649 |
| 8,174,738 B2 | 5/2012 | Ono et al. | 358/474 |
| 8,300,278 B2 | 10/2012 | Uchida et al. | 358/474 |
| 8,482,819 B2 | 7/2013 | Schmidt et al. | 358/475 |
| 2008/0158533 A1 | 7/2008 | Shimizu et al. | 355/66 |
| 2012/0099161 A1 | 4/2012 | Hisa et al. | 358/474 |
| 2012/0307329 A1 | 12/2012 | Sugiyama | 359/204.1 |
| 2018/0095241 A1* | 4/2018 | Ishidate | G02B 26/12 |
| 2021/0262942 A1 | 8/2021 | Davis et al. | G01N 2201/0627 |

* cited by examiner

IMAGE READING APPARATUS AND IMAGE FORMING APPARATUS

This application is a division of application Ser. No. 17/096,363 filed Nov. 12, 2020, now U.S. Pat. No. 11,330,135 and claims priority under 35 U.S.C. § 119 from Japan application No. 2019-216149 filed in Japan on Nov. 29, 2019; the content of all of which are incorporated herein by reference as if set forth in full.

FIELD OF THE INVENTION AND RELATED ART

The present invention relates to an image reading apparatus for reading an image of an original and an image forming apparatus for forming the image on a recording material.

The image reading apparatus for use with a document scanner or a copying machine irradiates the original with light and forms an image of reflected light on an image pick-up device (light receiving element). The image pick-up device converts the formed image into an electric signal and outputs the electric signal. The reflected light from the original is reflected by a reflection member and is guided to the image pick-up device.

In a constitution of Japanese Laid-Open Patent Application (JP-A) 2017-163604, a projection opposing a reflecting surface of a mirror is provided on a housing in which the mirror which is the reflection member is accommodated. In this constitution, the projection and the reflecting surface of the mirror are bonded to each other, so that the mirror is fixed.

In the constitution of JP-A 2017-163604, onto the reflecting surface of the mirror, an adhesive is applied, and therefore, there was a liability that a droplet and a spray of the adhesive are deposited on an effective reflect region of the reflecting surface and has an influence on a reading image.

SUMMARY OF THE INVENTION

A principal object of the present invention is to provide an image reading apparatus and an image forming apparatus which are capable of reducing a possibility that deposition (adhesion) of an adhesive has an influence on a reading image.

According to an aspect of the present invention, there is provided an image reading apparatus for reading an image of an original, comprising: an illumination portion configured to illuminate the original with light; a reflection member including a reflecting surface for reflecting the light from the original; a converting portion configured to photoelectrically convert the light reflected by the reflection member; and a casing configured to accommodate the reflection member, wherein the casing is provided with an opening which is open to an outside of the casing, and wherein a surface of the reflecting member opposite from the reflecting surface and a portion defining the opening are bonded to each other with an adhesive.

Further features of the present invention will become apparent from the following description of exemplary embodiments with reference to the attached drawings.

Figure 4:
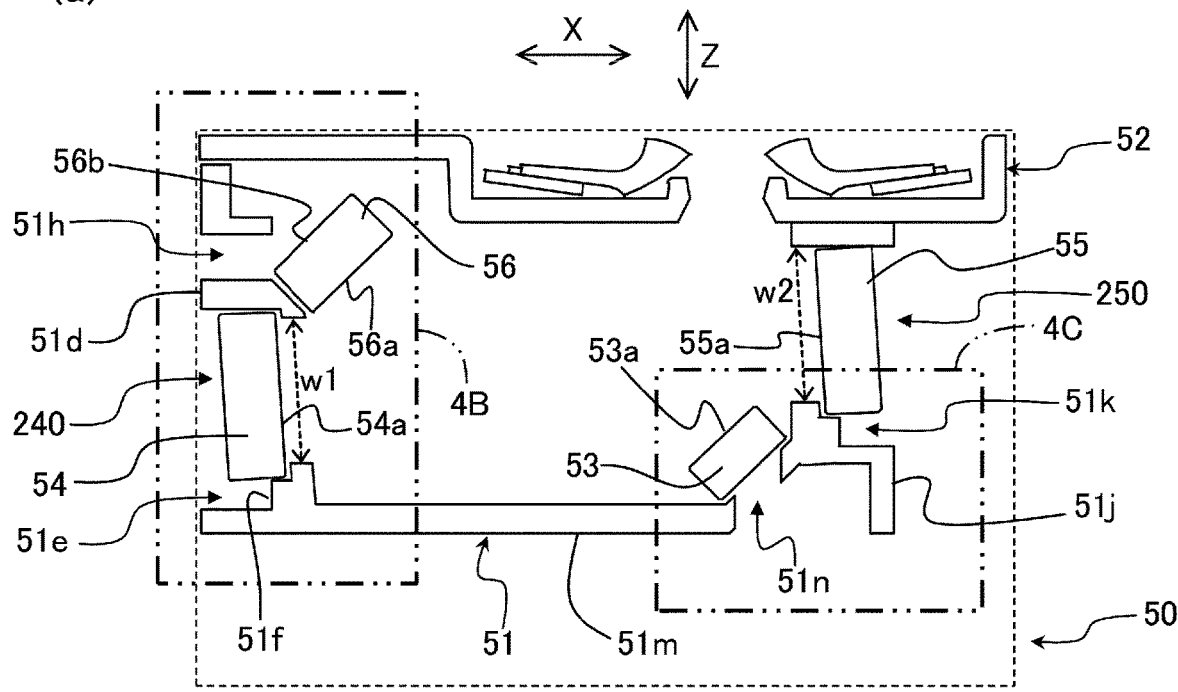
Figure 4:
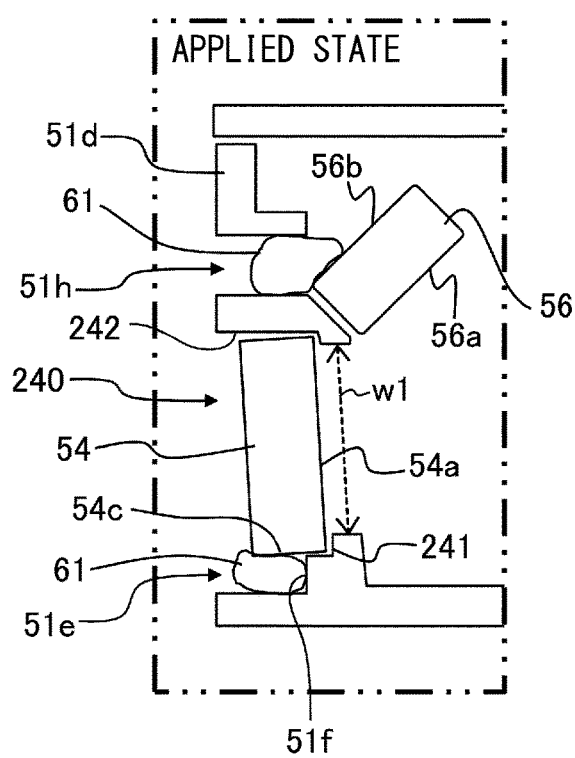
Figure 4:
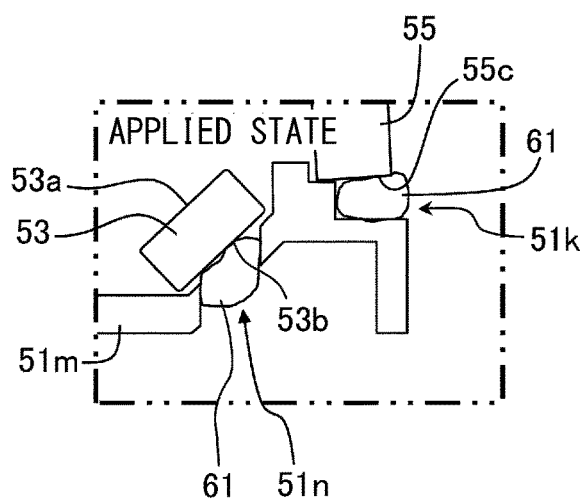

Parts (a) of FIG. 4 is a schematic view for illustrating a connection structure between a mirror and a box frame, and parts (b) and (c) of FIG. 4 are enlarged views each showing a part of the connection structure.

Figure 5:
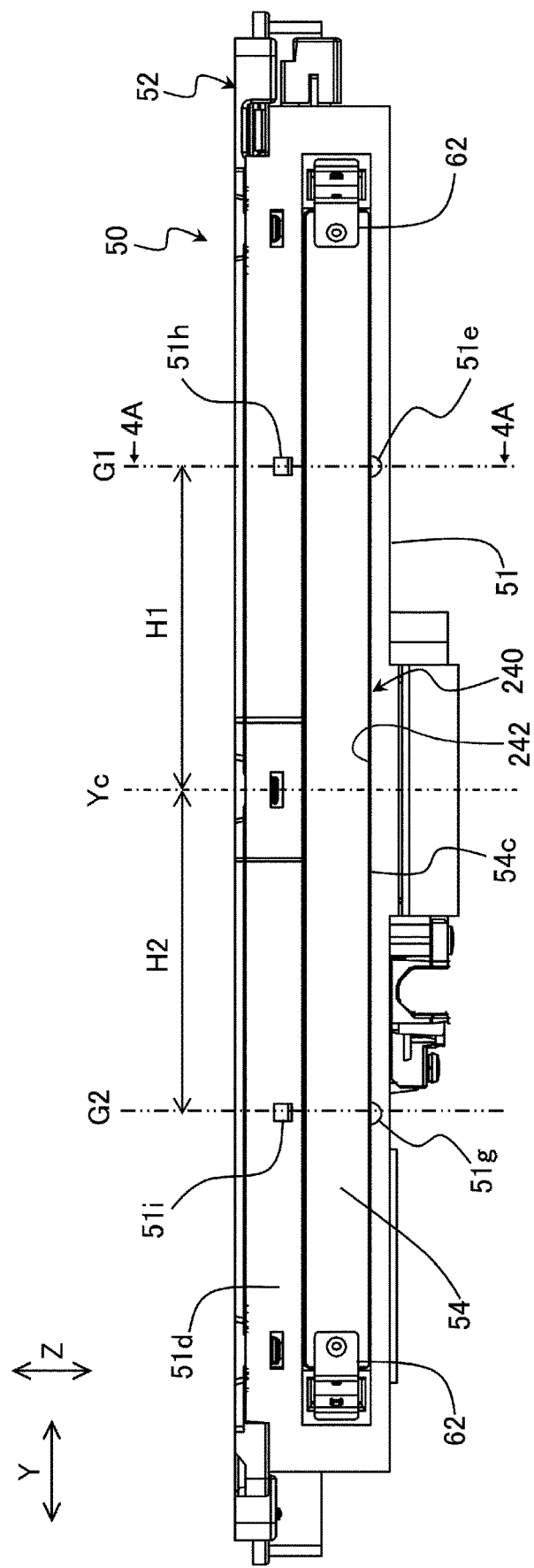

FIG. 5 is a schematic view of a scanner unit as seen from one side with respect to a sub-scan direction.

Figure 6:
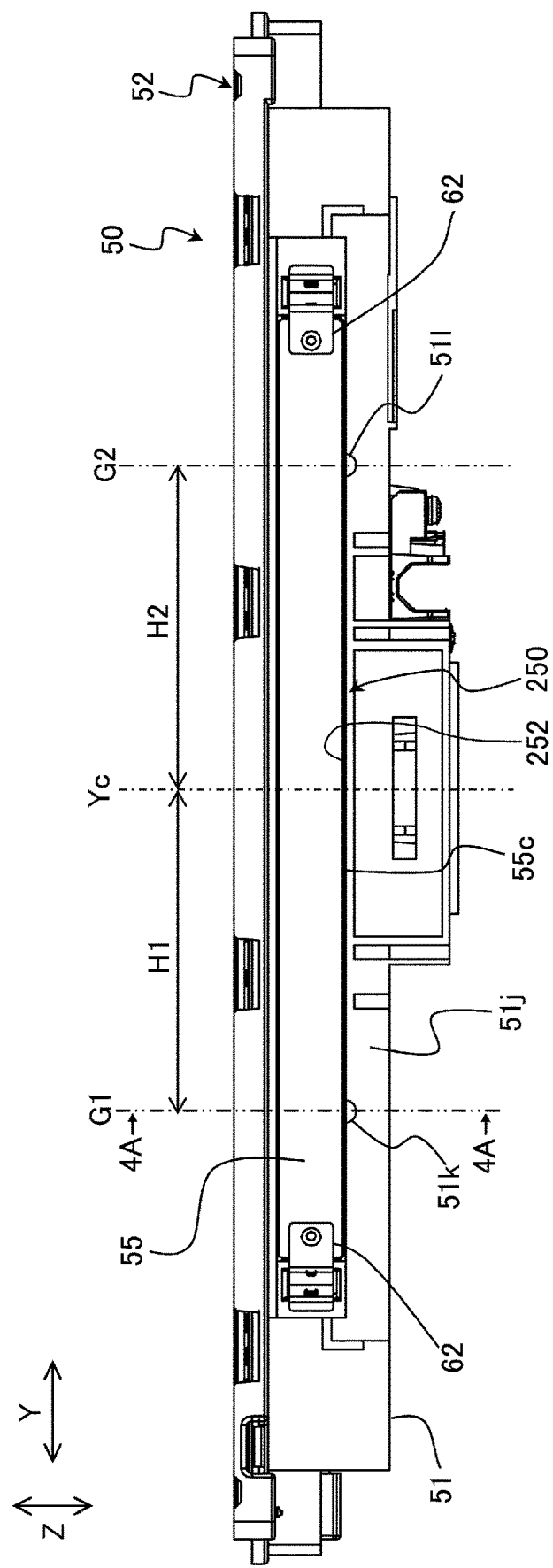

FIG. 6 is a schematic view of the scanner unit as seen from the other side with respect to the sub-scan direction.

Figure 7:
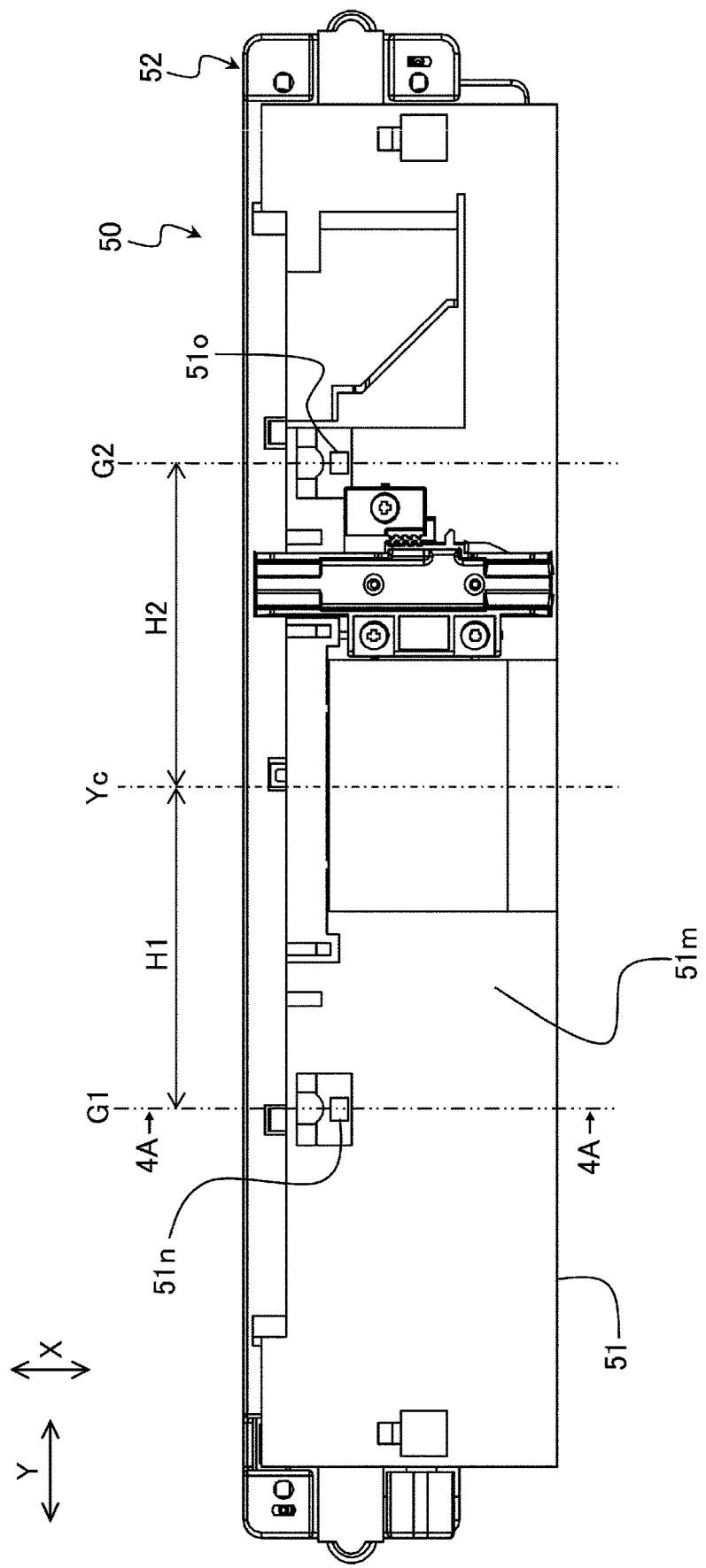

FIG. 7 is a schematic view of the scanner unit as seen in a height direction.

DESCRIPTION OF EMBODIMENTS

In the following, an exemplary embodiment for carrying out the present invention will be described with reference to the drawings.

Figure 1:
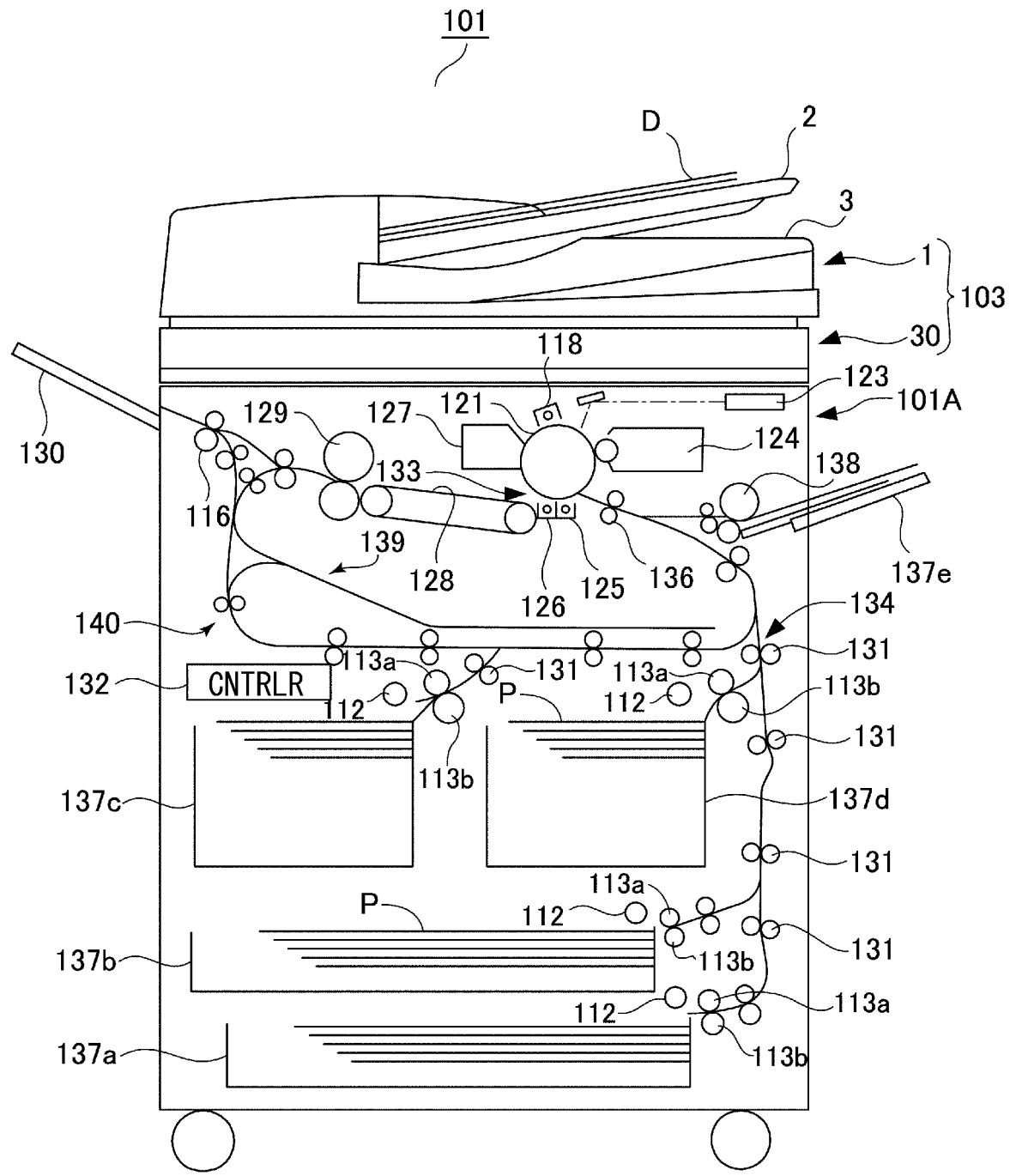
FIG. 1 is a schematic view of a printer according to an embodiment of the present invention.

First, a general structure of a printer 101 which is an image forming apparatus of this embodiment will be described with reference to FIG. 1. The printer 101 includes a printer main assembly 101A and an image reading apparatus 103 as shown in FIG. 1. The image reading apparatus 103 provided on the printer main assembly 101A includes a main body unit 30 and an ADF (automatic document feeder) 1 as described specifically later and reads image information by optically scanning an original D. The original D is a sheet including paper such as a sheet or an envelope, a plastic film such as a sheet for an overhead projector (OHP), a cloth, or the like. The image information converted into an electrical signal by the image reading apparatus 103 is transferred to a controller 132 provided in the printer main assembly 101A.

The printer main assembly 101A includes an image forming portion 133 for forming an image on a sheet P which is a recording material (medium) and a sheet feeding portion 134 for feeding the sheet P to the image forming portion 133. The sheet feeding portion 134 includes sheet accommodating portions 137a, 137b, 137c and 137d capable of accommodating sheets different in size from each other. The sheets accommodated in each of the sheet accommodating portions are fed by a pick-up roller 112 and separated one by one by a feed roller 113a and a retard roller 113b, and then is delivered to a corresponding feeding roller pair 131. Then, the sheet P is successively delivered to a plurality of feeding roller pairs 131 provided along a sheet feeding path, and then is fed toward a registration roller pair 136.

Incidentally, the sheet P placed on a manual feeding tray 137e by the user is fed to an inside of the printer main assembly 101A by a feeding roller 138 and then is fed toward the registration roller pair 136. The registration roller pair 136 not only corrects oblique movement of the sheet P by stopping a leading end of the sheet P but also resumes feeding of the sheet P in synchronism with progress of an image forming operation which is a toner image forming process by the image forming portion 133.

The image forming portion 133 for forming the image on the sheet P is an image forming unit of an electrophotographic type in which a photosensitive drum 121 which is a photosensitive member. The photosensitive drum 121 is rotatable along a feeding direction of the sheet P, and at a periphery of the photosensitive drum 121, a charger 118, an exposure device 123, a developing device 124, a transfer charger 125, a separation charger 126 and a cleaner 127 are provided. The charger 118 electrically charges a surface of the photosensitive drum 121, and the exposure device 123 exposes the photosensitive drum 121 to light on the basis of the image information inputted from the image reading apparatus 103 or the like, so that an electrostatic latent image is formed on the photosensitive drum 121.

The developing device 124 accommodates a developer containing toner and develops the electrostatic latent image into a toner image by supplying charged toner to the photosensitive drum 121. The toner image carried on the photosensitive drum 121 is transferred onto the sheet P fed from the registration roller pair 136, by a bias electric field formed by the transfer charger 125. The sheet P on which the toner image is transferred is spaced from the photosensitive drum 121 by a bias electric field formed by the separation charger 126 and then is fed toward a fixing portion 129 by a pre-fixing feeding portion 128. Incidentally, a deposited matter such as a transfer residual toner or the like remaining on the photosensitive drum 121 without being transferred onto the photosensitive drum 121 is removed by the cleaner 127, and the photosensitive drum 121 prepares for a subsequent image forming operation.

The sheet P fed to the fixing portion 129 is subjected to a fixing process including pressing and heating while being nipped and pressed by a roller pair. As a result, an image is fixed on the sheet P by melting and then fixing of the toner on the sheet P. In the case where image output is completed, the sheet P on which a fixed image is obtained is discharged through a discharging roller pair 116 onto a discharge tray 130 projecting toward an outside of the printer main assembly 101A. In the case where the image is formed on a back surface of the sheet P in double-side printing, the sheet P passed through the fixing portion 129 is turned upside down by a reversing portion 139, and is fed toward the registration roller pair 136 through a feeding path 140 for the double-side printing. Then, the sheet P on which the image is formed again by the image forming portion 133 is discharged onto the discharge tray 130.

The image forming portion 133 is an example of an image forming means, and for example, an image forming unit of an ink jet type or a printing mechanism of an offset printing type may also be used as the image forming means.

(Image Reading Apparatus)

Next, with reference to FIGS. 1 to 3, a structure of the image reading apparatus 103 will be described. As shown in FIG. 1, the ADF 1 feeds the original D, placed on an original feeding tray 2, toward an original discharge tray 3. The ADF 1 is openable relative to the main body unit 30, and the main body unit 30 is fixed to the printer main assembly 101A.

Figure 2:
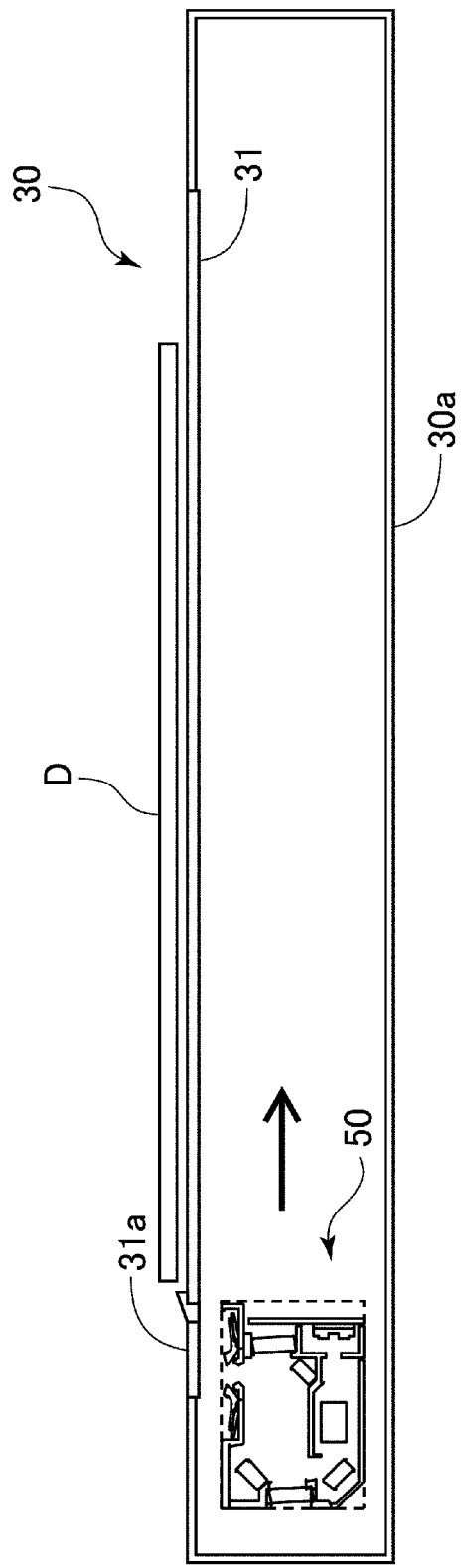
FIG. 2 is a schematic view showing a main body of a scanner of an image reading apparatus.

The main body unit 30 includes, as shown in FIG. 2, a frame 30a also functioning as an outer casing member, and at an upper surface of the frame 30a, an original supporting platen glass 31 as an image reading portion and a platen glass 31a are provided. The original supporting platen glass 31 is stacking table in this embodiment. Inside the frame 30a, a scanner unit 50 is held. The scanner unit 50 is supported by a frame 30a so as to be movable in parallel to the original supporting platen glass 31 by an unshown wire or belt driven by a motor.

Figure 3:
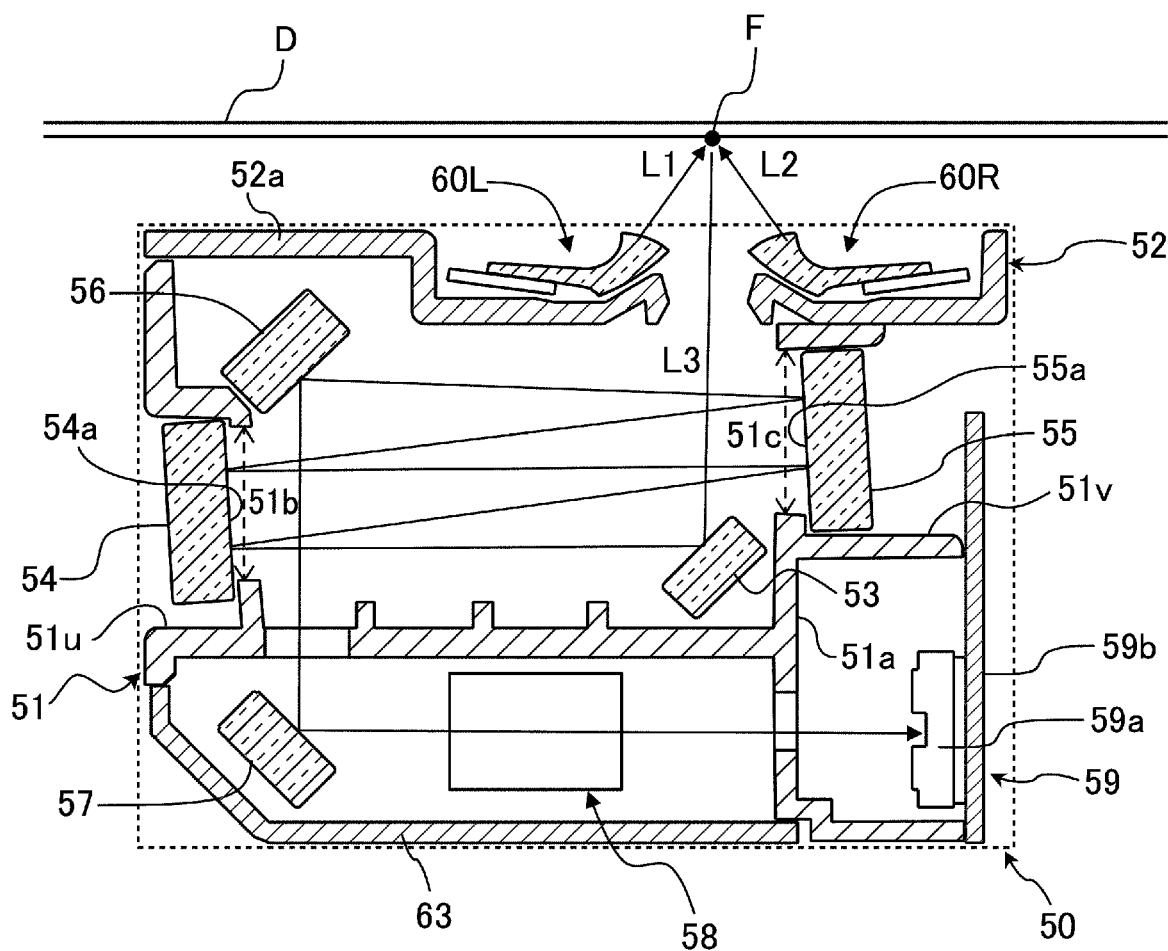
FIG. 3 is a schematic view showing a cross-sectional structure of a scanner unit.

The scanner unit 50 is an image reading unit of a CCD (Charge Coupled Device) type as shown in FIG. 3. The scanner unit 50 includes a box frame 51, an illumination unit 52 as an illumination portion, a first mirror 53, a second mirror 54, a third mirror 55, a fourth mirror 56, a fifth mirror 57, a lens unit 58 and a CCD substrate 59. The first mirror 53 and the fourth mirror 56 are accommodated in the box frame 51. On the CCD substrate 59, a CCD 59a which is an example of an imaging (image pick-up) device is arranged along a main scan direction. As a converting portion for photoelectrically converting light from the original, the CCD 59a was used as an example of the imaging device, but it is also possible to use a CMOS (complementary metal oxide semiconductor) as the converting portion.

The illumination unit 52 is mounted above the box frame 51 constituting a casing of the scanner unit 50. The illumination unit 52 includes unshown light emitting elements (for example, light emitting diodes), and two light guide units 60L and 60R. An original D as an object subjected to reading of image information is irradiated with light L1 and light L2 which are emitted by the light emitting elements in a state in which they are uniformly diffused in the main scan direction by the light guide units 60L and 60R.

A position at which the light emitted from the light guide units 60L and 60R is concentrated on a reading surface is referred to as an "original irradiation (illumination) position F". A sub-scan direction is a direction perpendicular to the main scan direction and is a movement direction of the scanner unit 50 in this embodiment when the scanner unit 50 moves below the original supporting platen glass 31. Further, the reading surface refers to a phantom (virtual) flat surface extending at a predetermined height (an object point position of an optical system) where the scanner unit 50 is capable of performing reading of image information with high accuracy with respect to a height direction (direction of depth of field) perpendicular to the main scan direction and the sub-scan direction. The reading surface in this embodiment corresponds to, for example, a lower surface of the original D in a state in which the original D is left at rest on the original supporting platen glass 31.

The five (first to fifth) mirrors 53 to 57 and the lens unit 58 form an optical path for guiding the reflected light from the original D to the CCD substrate 59. As the respective mirrors 53 to 57 which are examples of a reflection member, for example, mirrors each provided with a reflecting surface prepared by forming an aluminum deposition film on a supporting member such as glass are used. The reflected light (light beam L3) reflected by the original D at the original irradiation position F travels through the first mirror 53, the second mirror 54, the third mirror 55, the fourth mirror 56, the fifth mirror 57 and the lens unit 58 and is focused as an image on the CCD 59a.

The CCD 59a receives the light beam L3 and photoelectrically converts the light beam L3 into an electric signal representing an image of the original D. Image information read by the CCD 59a is transmitted to a controller 132 of the printer main assembly 101A and is used for image formation by the image forming portion 133.

In the following, a path of the light, of scattered light reflected by the original D, travelling through the first mirror 53, the second mirror 54, the third mirror 55, the fourth mirror 56, the fifth mirror 57 and the lens unit 58 and reaching the CCD 59a is referred to as an optical path of the scanner unit 50. The light beam L3 shown in FIG. 3 is a light beam which represents a pencil of light (ray bundle) delivered from the original irradiation position F and reaching the CCD 59a through the optical path of the scanner unit 50. An optical system constituted by the first to fifth mirrors 53 to 57 is supported by the box frame 51. The box frame 51 further supports the lens unit 58 and the CCD 59a.

A space inside the box frame 51 is covered at an upper portion thereof with the illumination frame 52a of the illumination unit 52 and is covered at a lower portion thereof with a lower cover 63 which is a cover in this embodiment. Further, as seen in the main scan direction, the CCD 59a is disposed in a space defined by a CCD accommodating portion 51a provided on the box frame 51 and a substrate main body 59b of the CCD substrate 59.

Further, the box frame 51 is reflection region with a first side wall opening 51b and a second side wall opening 51c which are closed by the second mirror 54 and the third mirror 55, respectively. Accordingly, the second mirror 54 and the third mirror 55 in this embodiment constitute a part of the outer casing partitioning the inside and the outside of the scanner unit 50 in cooperation with the box frame 51, the frame 52a of the illumination unit 52, the lower cover 63 and the substrate main body 59b. The inside of the scanner unit 50 is a space in which the normal optical path and the reading portion and accommodated. Here, a constitution in which the casing (optical box) accommodating the first mirror 53 and the fourth mirror 56 is constituted by the box frame 51 and the frame 52a was described, but this is merely an example, and a shape and an arrangement of the casing can be appropriately changed.

The thus-constituted image reading apparatus 103 reads image information from a sheet as the original D in a skimming (through) mode in which an original image is scanned while feeding the original D by the ADF 1 and in a fixedly reading mode in which the original placed on the original supporting platen glass 31 is scanned.

The skimming mode is selected in the case where the image reading apparatus detects the original D placed on the original feeding tray 2 or in the case where the user explicitly provides an instruction through the operating panel or the like of the printer main assembly 101A. In this case, in a state in which the scanner unit 50 is positioned below the platen glass 31a, the ADF 1 feeds the original D, placed on the original feeding tray 2, one by one, and then, the scanner unit 50 reads the image information from the fed original D. That is, in the skimming mode, the original D is scanned by being fed in the sub-scan direction relative to the scanner unit 50 of which position is fixed.

On the other hand, the fixedly reading mode is selected in the case where the image reading apparatus detects the original D placed on the original supporting platen glass 31 or in the case where the user explicitly provides an instruction through the operating panel or the like of the printer main assembly 101A. In the case of the fixedly reading mode, first, the user opens the ADF 1 and places the original on the original supporting platen glass 31 and closes the ADF 1, so that the original is positioned relative to the original supporting platen glass 31. Then, the scanner unit 50 reads the image information from the original D placed on the original supporting platen glass 31 while moving along the original supporting platen glass 31. That is, in the fixedly reading mode, the scanner unit 50 scans the original D while moving in the sub-scan direction relative to the original D which is positionally fixed.

Incidentally, the scanner unit 50 may also be mounted in an image reading apparatus capable of executing an operation in only one of the skimming mode and the fixedly reading mode. Further, by additionally providing the scanner unit 50 inside the ADF 1, and the image information may also be read by the two scanner units from both sides (surfaces) of the original D fed by the ADF 1.

(Connection Structure Between Mirror and Box Frame)

A structure connecting the mirrors disposed in the scanner unit 50 and the box frame 51 will be described.

Part (a) of FIG. 4 is a sectional view of the scanner unit 50 in a position of a line 4A-4A in each of FIGS. 5 to 7 as seen in a main scan direction, and parts (b) and (c) of FIG. 4 are enlarged views each showing a part of the scanner unit 50. FIG. 5 is a side view of the scanner unit 50 as seen from one side (left-hand side of part (a) of FIG. 4) with respect to the sub-scan direction. FIG. 6 is a side view of the scanner unit 50 as seen from the other side (right-hand side of part (a) of FIG. 4) with respect to the sub-scan direction. FIG. 7 is a side view of the scanner unit 50 as seen in a height direction perpendicular to the main scan direction and the sub-scan direction (from a side below the scanner unit 50 of part (a) of FIG. 4).

Incidentally, part (a) of FIG. 4 and FIGS. 5 to 7 show a state in which an adhesive 61 is not applied yet, and parts (b) and (c) of FIG. 4 shows a state after an adhesive 61 is applied. Further, in FIGS. 4 to 7, the sub-scan direction is represented by an arrow "X", the main scan direction is represented by an arrow "Y", and a height direction perpendicular to the main scan direction and the sub-scan direction is represented by an arrow "Z".

(1) Second Mirror Connection Structure

First, the second mirror 54 which is an example of the reflection member will be described. As shown in part (a) of FIG. 4 and FIG. 5, the box frame 51 includes a side wall portion 51d provided with a recessed portion 51e on one side with respect to the sub scan direction X. The recessed portion 51e is a semicylindrical recessed portion (groove shape) extending from the outside toward the inside of the scanner unit 50 along the sub scan direction X. In other words, the recessed portion 51e has a semi circular opening shape as seen in the sub scan direction X as shown in FIG. 5. As shown in part (b) of FIG. 4, by applying an adhesive 61 onto the recessed portion 51e, so that the second mirror 54 and the box frame 51 are connected to each other.

Specifically, the second mirror 54 is mounted so that a window portion w1 provided on the side wall portion 51d is covered from the outside of the box frame 51. The side wall portion 51d is provided with a second mirror mounting portion 240 as a recessed portion recessed from the outside toward the inside of the box frame 51 (i.e., from a left hand side toward a right hand side of part (a) of FIG. 4). The window portion w1 is an opening formed at a bottom (portion) 241 of the second mirror mounting portion 240, and an effective reflect region of a reflecting surface 54a of the second mirror 54 is exposed toward the inside of the box frame 51 through the window portion w1. The second mirror 54 is disposed in the second mirror mounting portion 240 as a mounting portion (FIG. 5), an outer peripheral portion of the second mirror 54 as seen in the sub scan direction X opposes an inner wall (inner surface) 242 of the second mirror mounting portion 240.

The groove portion (recessed portion) 51e where the adhesive 61 is applied is provided on the inner window 242. The groove portion 51e is provided in a position opposing the end surface 54c, with respect to the height direction Z, of the second mirror 54 engaged in the second mirror position 240 (part (b) of FIG. 4 and FIG. 5). Accordingly, when the adhesive 61 is applied (injected) into the groove portion 51e as shown in part (b) of FIG. 4 and then is cured, the inner peripheral surface of the groove portion 51e and the side surface (end surface) 54c of the second mirror 54 with respect to the height direction Z are bonded to each other through the adhesive 61. In other words, the end surface 54c of the second mirror 54, which is an example of the reflection member, with respect to a direction along the reflecting surface 54a and the inner wall 242 defining the second mirror mounting portion 240 are bonded to each other by the adhesive 61.

Here, in order to suppress that the adhesive 61 applied into the groove portion 51e passes through a minute gap and wraps around the reflecting surface 54a of the second mirror 54, as the adhesive 61, an adhesive having proper viscosity may desirably be selected. Further, the bottom 51f of the groove portion 51e is disposed toward the outside of the box frame 51 than the reflecting surface 54a of the second mirror 54 is, and thus a stagnation shape of the adhesive 61 may preferably be formed. That is, the bottom 51f of the groove portion 51e with respect to the sub-scan direction X may preferably be disposed toward the outside (left-hand side of parts (a) and (b) of FIG. 4) with respect to the sub-scan direction X than a bottom 241 of the second mirror mounting portion 240 opposing the reflecting surface 54a of the second mirror at a periphery of the window portion w1 is. By this, when the adhesive 61 is applied (injected) into the groove portion 51e from the left-hand side of part (b) of FIG. 4, flow of the adhesive 61 is received by the bottom 51f of the groove portion 51e, and therefore, it is possible to effectively suppress that a part of the adhesive 61 wraps around the reflecting surface 54a. In a cross-section of part (a) of FIG. 4, of the inner wall 242, a surface opposing the end surface 54c of the second mirror 54 includes a first portion 91 and a second portion 92 which is the inner peripheral surface of the groove portion 51e. Here, the second portion 92 where the adhesive is applied is more distant from the reflecting surface 54a with respect to the direction perpendicular to the reflecting surface 54a of the second mirror 54 than the first portion 91 is and is more distant from the end surface 54c of the second mirror 54 with respect to the direction along the reflecting surface 54a than the first portion 91 is. By this positional relationship between the first portion 91 and the second portion 92 (groove portion 51e), it is possible to suppress that a part of the adhesive 61 wraps around the reflecting surface 54a.

Further, as the adhesive 61, it is preferable that an adhesive (for example, an adhesive for which Young's modulus after curing is smaller than Young's modulus of a constituent material of the box frame 51) which has elasticity and which is relatively soft. By this, even in the case where the scanner unit 50 is moved in the sub-scan direction or even in the case where vibration occurs due to external impact or the like, by the elasticity of the adhesive 61, it is possible to suppress the vibration transmitted to the second mirror 54. This contributes to stable image reading with accuracy.

In the case where the adhesive having the elasticity is used, it is desirable that a fixing means between the mirrors and the box frame 51 is separately prepared. In this embodiment, the second mirror 54 is fixed to the box frame 51 at opposite end portions with respect to the main scan direction by fixing members 62 and 62 which are leaf springs made of metal as shown in FIG. 5.

Further, the box frame 51 in this embodiment is provided with another groove portion 51g different in position from the groove portion 51e with respect to the main scan direction Y as shown in FIG. 5. The second mirror 54 is bonded to the box frame 51 by the adhesive 61 applied into the groove portion 51g, in addition to the adhesive 61 into the groove portion (recessed portion) 51e. Thus, in the case where a plurality of groove portions 51e and 51g for permitting bonding of the mirror onto the box frame 51 with the adhesive are provided, as shown in FIG. 5, these groove portions may preferably be symmetrically disposed on the basis of center position Yc with respect to the main scan direction Y of the scanner unit 50. In an example shown in FIG. 5, the two groove portions 51e and 51g are provided, and therefore, with respect to the main scan direction Y, distances H1 and H2 from the center position Yc to positions (opening groove portions) of the groove portions 51e and 51g, respectively, are equal to each other (H1=H2).

Incidentally, the number of the groove portions used for applying the adhesive to the second mirror 54 may also be one or three or more, and a constitution in which the fixing members 62 and 62 are omitted and in which the second mirror 54 is bonded to the box frame 51 only with the adhesive 61 may also be employed.

(2) Fourth Mirror Connection Structure

First, the fourth mirror 56 which is another example of the reflection member will be described. As shown in part (a) of FIG. 4 and FIG. 5, the box frame 51 includes a side wall portion 51d provided with a hole 51h on one side with respect to the sub-scan direction X. The hole 51h which is another example of the opening is a through hole penetrating from the outside toward the inside of the scanner unit 50. The hole 51h establishes communication between an outside space of the box frame 51 and a back surface 56b of the fourth mirror 56. Here, the back surface 56b is a surface of the opposite from a reflecting surface 56a of the fourth mirror 56. As shown in part (b) of FIG. 4, by applying an adhesive 61 into the hole 51h, so that the fourth mirror 56 and the box frame 51 are connected to each other.

The fourth mirror 56 is provided inside the box frame 51 and is disposed so that the back surface 56b of the fourth mirror 56 overlaps with the hole 51h as seen from the outside (left-hand side of FIG. 4) of the scanner unit 50 (part (b) of FIG. 4 and FIG. 5).

As shown in part (b) of FIG. 4, when the adhesive 61 is applied (injected) into the hole 51h and cured in a state in which the fourth mirror 56 is set at a position where the fourth mirror 56 is opposed to the hole 51h at the back surface 56b thereof, an inner wall of the hole 51h and the back surface 56b of the fourth mirror 56 are bonded to each other through the adhesive 61. In other words, the fourth mirror 56 which is an example of the reflection member is bonded to the box frame 51 by the adhesive 61 at a side surface different from the reflecting surface 56a.

Similarly as in the case of the above-described second mirror 54, in order reduce a degree such that the adhesive 61 wraps around the reflecting surface 56a, as the adhesive 61, it is desirable that an adhesive with proper viscosity is selected. Further, by disposing the hole 51h so as to oppose the back surface 56b of the fourth mirror 56, an application region is positioned away from the reflecting surface 56a, and therefore, it is possible to further effectively suppress that the adhesive 61 wraps around the reflecting surface 56a. Further, similarly as in the case of the second mirror 54, it is suitable that an adhesive (agent) which has elasticity and which is relatively soft is used as the adhesive.

Further, the box frame 51 in this embodiment is provided with another hole 51i different in position from the hole 51h with respect to the main scan direction Y as shown in FIG. 5. The second mirror 54 is bonded to the box frame 51 by the adhesive 61 applied into the hole 51i, in addition to the adhesive 61 into the hole 51h. Thus, in the case where a plurality of holes 51h and 51i for permitting bonding of the mirror to the box frame 51 with the adhesive are provided, as shown in FIG. 5, these groove portions may preferably be symmetrically disposed on the basis of center position Yc with respect to the main scan direction Y of the scanner unit 50. In an example shown in FIG. 5, the two holes 51h and 51i are provided, and therefore, with respect to the main scan direction Y, distances H1 and H2 from the center position Yc to positions (opening groove portions) of the holes 51h and 51i, respectively, are equal to each other (H1=H2).

Incidentally, the number of the openings (holes) used for applying the adhesive to the fourth mirror 56 may also be one or three or more.

Here, as shown in FIG. 5, the recessed portion 51*e* used for connection between the second mirror 54 and the box frame 51 and the hole 51*h* used for connection between the fourth mirror 56 and the box frame 51 are distant from the center position Yc by the same distance with respect to the main scan direction (H1=H1). That is, the recessed portion 51*e* and the hole 51*h* are positioned in the same position and are disposed on the same phantom (virtual) plane G1 perpendicular to the main scan direction Y1. Incidentally, in FIG. 5, the phantom plane G1 is represented by a phantom line extending in the height direction Z, and the recessed portion 51*e* and the hole 51*h* are arranged on the phantom line. When the second mirror 54 is a first reflection member in this embodiment and the recessed portion 51*e* is a first opening in this embodiment, the fourth mirror 56 is an example of a second reflection member and the hole 51*h* is an example of a second opening.

When the position of the recessed portion 51*e* with respect to the main scan direction Y and the position of the hole 51*h* with respect to the main scan direction Y are disposed so as to at least partially overlap with each other, the following advantage is achieved. In the case where the connection of the second mirror 54 to the box frame 51 and the connection of the fourth mirror 56 to the box frame 51 are successively performed, there is no need to operate an application means such as a needle or the like, and therefore, an applying step can be simplified. Particularly, in the case where an automatic application device is used, simplification of a device structure, simplification of control and reduction in application time become possible, and therefore, a large advantage is achieved.

Similarly, as regards the recessed portion 51*g* and the hole 51*i* positioned on the side opposite from the recessed portion 51*e* and the hole 51*h* on the basis of the center position Yc with respect to the main scan direction Y, the position of the recessed portion 51*g* with respect to the main scan direction Y and the position of the hole 51*i* with respect to the main scan direction Y are disposed so as to at least partially overlap with each other (particularly, at the same position with respect to the main scan direction Y). That is, the recessed portion 51*g* and the hole 51*i* are disposed on the same phantom plane G2 perpendicular to the main scan direction Y and are arranged on the same phantom plane G2 extending in the height direction Z in FIG. 5. By this, the application step of the adhesive 61 in the case where the connection of the second mirror 54 to the box frame 51 and the connection of the fourth mirror 56 to the box frame 51 are successively carried out can be simplified.

(3) Third Mirror Connection Structure

A connection structure of a third mirror 55 which is another example of the reflection member is similar to the connection structure of the second mirror 54 described above.

As shown in parts (a) and (c) of FIG. 4 and FIG. 6, the box frame 51 includes a side wall portion 51*j* provided with a recessed portion 51*k* on the other side with respect to the sub-scan direction X. The recessed portion 51*k* which has a recessed shape recessed from the outside toward the inside of the scanner unit 50 and has a semicylindrical shape (a semi-circular opening shape as seen in the sub-scan direction X as shown in FIG. 6 extending along the sub-scan direction X). As shown in part (c) of FIG. 4, by applying an adhesive 61 into the recessed portion 51*k*, so that the third mirror 55 and the box frame 51 are connected to each other.

As shown in FIG. 6, at a position symmetrical with the recessed portion 51*k* of the scanner unit 50 on the basis of the center position Yc with respect to the main scan direction Y, another recessed portion 51*l* is provided, and the third mirror 55 is adhesively bonded to the box frame 51 also by the adhesive 61 applied into the recessed portion 51*l*.

Specifically, the third mirror 55 is mounted so that a window portion w2 provided on the side wall portion 51*j* is covered from the outside of the box frame 51. The side wall portion 51*d* is provided with a third mirror mounting portion 250 recessed from the outside toward the inside of the box frame 51 (i.e., from a right-hand side toward a left-hand side of part (a) of FIG. 4). The window portion w2 is a through hole formed at a bottom (portion) 251 of the third mirror mounting portion 250. The third mirror 55 is engaged in the third mirror mounting portion 250 which is another example of an accommodating portion (FIG. 6), an outer peripheral portion of the third mirror 55 as seen in the sub-scan direction X opposes an inner wall (inner surface) 252 of the third mirror position 250.

The recessed portions 51*k* and 51*l* where the adhesive 61 is applied communicate with the third mirror mounting portion 250 and opposes the side surface 55*c*, with respect to the height direction Z, of the third mirror 55 engaged in the third mirror position 250 (part (a) of FIG. 4 and FIG. 6). Accordingly, when the adhesive 61 is applied into the recessed portion 51*k* as shown in part (c) of FIG. 4 and then is cured, the inner peripheral surface of the recessed portion 51*k* and the side surface 55*c* of the third mirror 55 with respect to the height direction Z are bonded to each other through the adhesive 61. In other words, the side surface 55*c* of the third mirror 55, which is different from the reflecting surface 55*a* is adhesively bonded to the box frame 51 by the adhesive 61.

Further, the third mirror 55 is fixed to the box frame 51 at opposite end portions with respect to the main scan direction by fixing members 62 and 62 which are leaf springs made of metal as shown in FIG. 6.

(4) First Mirror Connection Structure

A connection structure of a first mirror 53 which is another example of the reflection member is similar to the connection structure of the fourth mirror 56 described above. As shown in parts (a) of FIG. 4 and FIG. 7, the box frame 51 includes a side wall portion (lower surface portion) 51*m* provided with a hole 51*n* with respect to the height direction Z. The hole 51*n* is a through hole penetrating from the outside toward the inside of the scanner unit 50. As shown in part (c) of FIG. 4 by applying an adhesive 61 into the hole 51*n*, so that the first mirror 53 and the box frame 51 are connected to each other.

As shown in FIG. 7, at a position symmetrical with the hole 51*n* of the scanner unit 50 on the basis of the center position Yc with respect to the main scan direction Y, another hole 51*o* is provided, and the first mirror 53 is adhesively bonded to the box frame 51 also by the adhesive 61 applied into the hole 51*o*.

The first mirror 53 is provided inside the box frame 51 and is disposed so that the back surface 53*b* of the first mirror 53 overlaps with the hole 51*n* as seen from the outside (lower side of FIG. 4) of the scanner unit 50 (part (c) of FIG. 4 and FIG. 7). However, the back surface 53*b* refers to a side surface of the first mirror 53 opposite from the reflecting surface 53*a* of the first mirror 53. A space defined by the back surface 53*b* of the first mirror 53 and an inner surface of the hole 51*n* is a space roughly sealed closely except for the opening toward the outside of the scanner unit 50.

As shown in part (c) of FIG. 4, when the adhesive 61 is applied (injected) into the hole 51n and cured in a state in which the fourth mirror 56 is set at a position where the first mirror 53 is opposed to the hole 51n at the back surface 53b thereof, an inner wall of the hole 51n and the back surface 53b of the first mirror 53 are bonded to each other through the adhesive 61. In other words, the first mirror 53 which is an example of the reflection member is bonded to the box frame 51 by the adhesive 61 at a side surface different from the reflecting surface 53a.

Further, as shown in FIGS. 5 to 7, the recessed portions 51e and 51k and the holes 51k and 51n, which are used for adhesive bonding of the first to fourth mirrors 53 to 56 are positioned in the same position and are disposed on the same phantom plane G1 perpendicular to the main scan direction Y1. This is also true for the recessed portions 51g and 51l and the holes 51i and 51o which are disposed symmetrically with the recessed portions 51e and 51k and the holes 51h and 51n, respectively, on the basis of the center position Yc with respect to the main scan direction Y. By this, in the case where the connection of each of the first to fourth mirrors 53 to 56 to the box frame 51 are successively performed, there is no need to operate an application means such as a needle or the like, and therefore, an applying step can be simplified.

However, in this embodiment, the second and fourth mirrors 54 and 56 and the first and third mirrors 53 and 55 are position on different side surfaces of the box frame 51, and application directions of the adhesive 61 are different from each other. For that reason, in the case where connection of each of the first to fourth mirrors 53 to 56 to the box frame 51 is successively performed, there is a need to rotate the scanner unit 50 or the application means around an axis with respect to the main scan direction.

Summary of this Embodiment

As described above, in this embodiment, when the reflection member is connected to the casing of the image reading unit, a constitution in which a surface of the reflection member different from the reflecting surface of the reflection member is connected to the casing with the adhesive is employed. By this, a possibility that the reading image is influenced by adhesion of the adhesive can be reduced. Incidentally, in this embodiment, a constitution in which each of all the four mirrors 53 to 56 which are examples of the reflection member is connected to the casing with the adhesive at the surface different from the reflecting surface is employed, but a similar effect can be obtained when the above constitution is employed for at least one of the reflection members.

Further, in this embodiment, a constitution in which as the opening which opens toward the outside of the casing, the recessed portion or the hole is provided and an adhesive application operation is enabled through the opening from the outside of the image reading unit is employed. By this, the adhesive application operation for the image connection (adhesive bonding) is simplified, so that an application error is reduced.

Incidentally, the present invention is not limited to the above-described embodiment, but can be variously modified and changed within a range which is not out of the scope of the appended claims.

For example, in order to properly support the reflection members by the casing, the shape and the number of the recessed portions and the holes which are examples of the openings may also be changed depending on a specific situation such as the weight of the reflection member, a length of the reflection member with respect to the main scan direction and the like. Further, in the above-described embodiment, connection of the second mirror 54 and the third mirror 55 is performed by using the recessed portions 51e and 51k, but the connection of these mirrors may also be carried out through the through holes. Further, in the above-described embodiment, the connection of the first mirror 53 and the fourth mirror 56 is performed by using the holes 51n and 51h which are the through holes, but the connection of these mirrors may also be carried out by using the recessed portions (recessed-shape portions each having the bottom). Further, as regards the connection of the single mirror, the recessed portion and the through hole may also be used in combination.

Further, in the above-described embodiment, the image reading apparatus 103 assembled with the image forming apparatus was described, but the present invention is also applicable to the image reading apparatus capable of being used singly. Further, the image reading unit explained in the above-described embodiment is not limited to the image reading unit for reading the image information from the sheet as the original, but may also be applicable as an apparatus for reading the image information for another purpose. For example, the image reading unit can be used an apparatus for reading an image, formed on the recording material, in order to adjust image density and to adjust a position and distortion of the image. Further, the image reading unit is also applicable to apparatuses, reading and using the image information, such as an authenticity discrimination apparatus of paper money and an apparatus for automatically sorting baggage in a distribution warehouse.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-216149 filed on Nov. 29, 2019, which are hereby incorporated by reference herein in their entirety.

What is claimed is:

1. An image reading apparatus for reading an image of an original, comprising:
    an illumination portion configured to illuminate the original with light;
    a reflection member including a reflecting surface for reflecting the light from the original illuminated with the light by said illumination unit;
    a converting portion configured to photoelectrically convert the light reflected by said reflection member; and
    a casing configured to accommodate said reflection member, the casing including a wall portion which faces a back surface of said reflecting member opposite from said reflecting surface,
    wherein said reflection member is bonded to said casing with an adhesive, and
    wherein said wall portion is provided with an opening through which the adhesive is applied to said reflection member.

2. An image reading apparatus according to claim 1, wherein said back surface of said reflecting member and an inner surface of said opening are bonded to each other with the adhesive.

3. An image reading apparatus according to claim 1, wherein said opening is covered with said back surface of said reflection member from an inside of said casing.

4. An image reading apparatus according to claim 1, further comprising:
- a first fixing member configured to fix said reflection member to said casing at one end portion with respect to a longitudinal direction of said reflection member; and
- a second fixing member configured to fix said reflection member to said casing at the other end portion with respect to the longitudinal direction of said reflection member,
- wherein said adhesive is positioned between said first fixing member and said second fixing member.

5. An image reading apparatus according to claim 1, wherein said wall portion is provided with another opening, through which an adhesive is applied to said reflection member, in a position different from said opening with respect to a longitudinal direction of said reflection member.

6. An image reading apparatus according to claim 1, wherein said adhesive with which said reflection member and said casing are bonded to each other is softer than said casing.

7. An image reading apparatus according to claim 1, further comprising a placement table on which the original is to be placed,
- wherein said casing is movably supported relative to said placement table.

8. An image reading apparatus according to claim 1, wherein said casing supports said converting portion.

9. An image reading apparatus for reading an image of an original, comprising:
- an illumination portion configured to illuminate the original with light;
- a reflection member including a reflecting surface for reflecting the light from the original illuminated with the light by said illumination unit;
- a converting portion configured to photoelectrically convert the light reflected by said reflection member; and
- a casing configured to support said reflection member, the casing including a recessed portion recessed from an outside toward an inside of said casing,
- wherein said reflection member is provided in said recessed portion,
- wherein an inner surface of said recessed portion is provided with a groove portion recessed in a first direction along said reflecting surface and extending in a second direction perpendicular to said reflecting surface, and
- wherein said reflection member is bonded to said groove portion with an adhesive.

10. An image reading apparatus according to claim 9, wherein said recessed portion includes a window portion which penetrates from the outside to the inside of said casing and where said reflecting surface of said reflection member provided in said recessed portion is exposed toward the inside of said casing.

11. An image reading apparatus according to claim 9, wherein a bottom of said groove portion with respect to the second direction is disposed toward the outside of said casing than said reflecting surface with respect to the second direction.

12. An image reading apparatus according to claim 9, wherein said reflection member includes an end surface with respect to the first direction, and
- wherein said end surface is bonded to said groove portion with the adhesive.

13. An image reading apparatus according to claim 9, wherein said adhesive with which said reflection member and said casing are bonded to each other is softer than said casing.

14. An image reading apparatus according to claim 9, further comprising:
- a first fixing member configured to fix said reflection member to said casing at one end portion with respect to a longitudinal direction of said reflection member; and
- a second fixing member configured to fix said reflection member to said casing at the other end portion with respect to the longitudinal direction of said reflection member,
- wherein said adhesive is positioned between said first fixing member and said second fixing member.

15. An image reading apparatus according to claim 9, further comprising a placement table on which the original is to be placed,
- wherein said casing is movably supported relative to said placement table.

16. An image reading apparatus according to claim 9, wherein said casing supports said converting portion.

* * * * *